(12) United States Patent
Koo et al.

(10) Patent No.: US 7,283,482 B2
(45) Date of Patent: Oct. 16, 2007

(54) REVERSE DATA TRANSMISSION APPARATUS AND METHOD IN A MOBILE COMMUNICATION SYSTEM

(75) Inventors: Chang-Hoi Koo, Songnam-shi (KR); Dong-Seek Park, Suwon-shi (KR); Dae-Gyun Kim, Songnam-shi (KR); Ho-Kyu Choi, Songnam-shi (KR); Beom-Sik Bae, Suwon-shi (KR); Hwan-Joon Kwon, Seoul (KR); Youn-Sun Kim, Seoul (KR); Jung-Su Jung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1119 days.

(21) Appl. No.: 10/218,919

(22) Filed: Aug. 14, 2002

(65) Prior Publication Data

US 2003/0039267 A1 Feb. 27, 2003

(30) Foreign Application Priority Data

Aug. 14, 2001 (KR) ................. 2001-49152
Sep. 14, 2001 (KR) ................. 2001-56739

(51) Int. Cl.
*G01R 31/08* (2006.01)
(52) U.S. Cl. ............... 370/252; 370/328; 370/342; 370/335; 370/229

(58) Field of Classification Search ............ None
See application file for complete search history.

(56) References Cited

U.S. PATENT DOCUMENTS

| 6,741,862 B2 * | 5/2004 | Chung et al. ............ 455/452.1 |
| 2002/0154610 A1 * | 10/2002 | Tiedemann et al. ......... 370/329 |
| 2002/0181410 A1 * | 12/2002 | Bae et al. .................. 370/252 |
| 2002/0191570 A1 * | 12/2002 | Kim et al. ................. 370/335 |
| 2003/0142656 A1 * | 7/2003 | Padovani et al. ........... 370/347 |

* cited by examiner

*Primary Examiner*—Duc Ho
(74) *Attorney, Agent, or Firm*—The Farrell Law Firm, P.C.

(57) ABSTRACT

A reverse data transmission apparatus and method in a mobile communication system. A mobile station receives information about an MADR (Maximum Allowable Data Rate) from a base station in a first predetermined frame period, determines a data rate equal to or lower than the MADR, and requests the determined data rate to the base station. If an MADR received from the base station in a second frame period following the first frame period is higher than the requested data rate, the mobile station starts data transmission. Then, the mobile station measures a traffic to pilot ratio (T/P) from the base station and controls the data rate according to the T/P during data transmission.

28 Claims, 14 Drawing Sheets

REVERSE DATA TRANSMISSION APPARATUS AND METHOD IN A MOBILE COMMUNICATION SYSTEM

PRIORITY

This application claims priority to an application entitled "Reverse Data Transmission Apparatus and Method in a Mobile Communication System" filed in the Korean Industrial Property Office on Aug. 14, 2001 and assigned Ser. No. 2001-49152, and to an application entitled "Reverse Data Transmission Apparatus and Method in a Mobile Communication System" filed in the Korean Industrial Property Office on Sep. 14, 2001 and assigned Ser. No. 2001-56739, the contents of which are hereby incorporated by reference.

BACKGROUND OF THE INVENTION

1. Field of the Invention

The present invention relates generally to data transmission in a mobile communication system, and in particular, to an apparatus and method for transmitting reverse data from an MS (Mobile Station) to a BS (Base Station).

2. Description of the Related Art

A typical mobile communication system such as CDMA (Code Division Multiple Access) supports only voice service. Due to the rapid development of mobile communication technology and the growing user demands, the traditional mobile communication system has been evolved to additionally provide data service. The major examples are 1xEV-DO ($1^{st}$ generation Evolution-Data Only) and 1xEV-DV ($1^{st}$ generation Evolution-Data and Voice) developed from CDMA 2000 1x systems. Those systems aim at efficient packet data transmission using the CDMA technology of high rate data transmission. Thus appropriate scheduling is very significant in the systems.

On the forward link, a BS transmits data to only an MS at the best channel condition, taking into account the air status and other environmental conditions, thereby maximizing the data transmission throughput of the MS in the mobile communication systems. On the reverse link, a plurality of mobile stations access the BS simultaneously to transmit packet data. Therefore the BS must appropriately control the reverse data flow and congestion, thus controlling overload within the capacities of the MSs.

The 1x EV-DO system, however, has limitations in effective control of the reverse link because it controls the reverse link via a common channel. Moreover, 1x EV-DV systems under discussion are yet to be defined specifically, not to speak of their reverse link operation. While 1x EV-DV has been discussed in relation to data rate control, the data rate control simply addresses a control of bandwidth and overload without considering the statuses of mobile stations. Consequently, such a uniform control across the MSs results in serious reverse bandwidth consumption and a decrease of reverse data transmission throughput.

SUMMARY OF THE INVENTION

It is, therefore, an object of the present invention to provide an efficient reverse data transmission method to improve system performance.

It is another object of the present invention to provide a data rate determining method for efficient reverse data transmission and improved system performance.

It is a further object of the present invention to provide a method of determining a reverse data rate, taking the status of an MS into account, and transmitting reverse data at the determined reverse data rate.

It is still another object of the present invention to provide a method of notifying the transmission status of each mobile station of a BS by the MS to enable the BS to efficiently manage radio resources.

To achieve the above and other objects, a mobile station receives information about an MADR from a base station in a first predetermined frame period, determines a data rate equal to or lower than a MADR (Maximum Allowed Data Rate), and requests the determined data rate to the base station. If an MADR received from the BS in a second frame period following the first frame period is higher than the requested data rate, the mobile station starts data transmission. Then, the mobile station measures a traffic to pilot ratio (T/P) from the base station and controls the data rate according to the T/P during data transmission.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
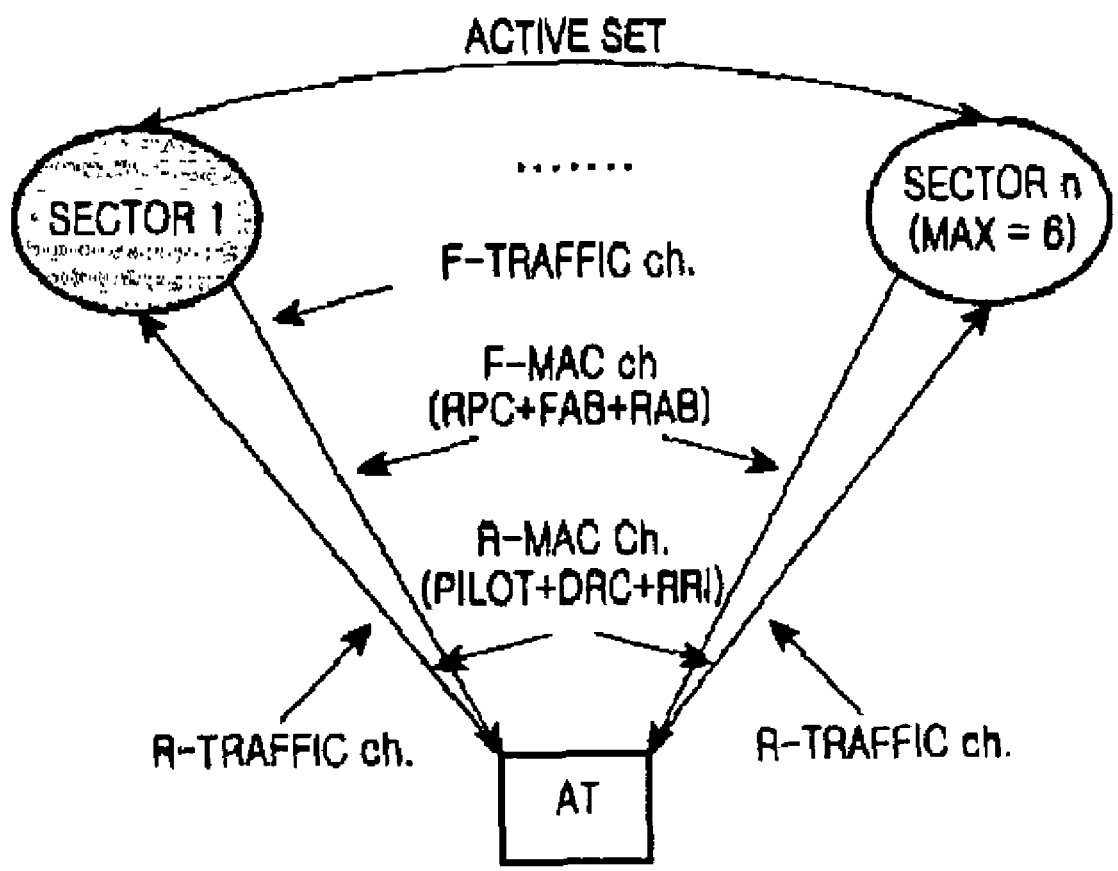
FIG. 1 illustrates signal transmission between sectors in an active set and an MS in a 1x EV-DO system to which the present invention is applicable.

Preferred embodiments of the present invention will be described herein below with reference to the accompanying drawings. In the following description, well-known functions or constructions are not described in detail since they would obscure the invention in unnecessary detail.

A. The Outline of the Present Invention

A description will be made of a method of improving system performance in a mobile communication system in which the reverse link is not efficiently controlled like 1x EV-DO, and the overall structure of a reverse link, the operation of the reverse link, and data rate control in 1x EV-DV. The present invention proposes the following channel structure listed in Table 1 for 1x EV-DV systems under the current discussion. In Table 1, reverse channels are under discussion for 1x EV-DV and forward channels, F-CDRCH and F-PANCH are proposed according to the present invention.

TABLE 1

Reverse Link Channel:

R-SCH 1 (Reverse Supplemental Channel 1) and R-SCH 2: packet data channels using RC (Radio Configuration) of 1x EV-DV
R-RICH (Reverse Rate Indicator Channel): indicates the data rate of packet data transmitted on an R-SCH
Forward Link Channel:

F-CDRCH (Forward Common Data Rate Channel): indicates a maximum data rate available to the reverse link
F-PANCH (Forward Packet Ack/Nack Channel): delivers feedback information Ack/Nack for received reverse packets When successive reverse frames have errors, a BS requests an MS to retransmit a maximum allowed number of frames or at least two frames for increasing reception throughput via the F-PANCH. The F-PANCH can be so configured to include Ack/Nack (Acknowledgment/Negative Acknowledgement) feedback information for R-SCH 1 and R-SCH 2 and information about the number of retransmission frames as illustrated in Table 2.

TABLE 2

Ack/Nack feedback information for SCH 1 and SCH 2: 2 bits
(00 = SCH 1-Ack, SCH 2-Ack, 01 = SCH 1-Ack, SCH 2-Nack, 10 = SCH 1-Nack, SCH 2-Ack, 11 = SCH-Nack, SCH 2-Nack)
Information about the number of retransmission frames: 2 bits
(00 = Null (Ack), 01 = one retransmission frame, 10 = two retransmission frames, 11 = Reserved)

Referring to Table 2, the Ack/Nack feedback information occupies two bits. If the feedback information is set to 00, it indicates that data on SCH 1 and SCH 2 has been successfully received. If the feedback information is set to 01, it indicates that reception of SCH 1 is good and reception of SCH 2 is bad. If the feedback information is set to 10, it indicates that reception of SCH 1 is bad and reception of SCH 2 is good. If the feedback information is set to 11, it indicates that reception of both SCH 1 and SCH 2 is bad. The information about the number of retransmission frames is two bits. If the frame number information is set to 00, it indicates that no retransmission is requested. If the frame number information is set to 01, it indicates that retransmission of one frame is requested. If the frame number information is set to 10, it indicates that retransmission of two frames is requested. If the frame number information is set to 11, it indicates that retransmission of a predetermined number of frames is requested.

A scheduling mode is used in a 1x system like IS-2000. In the scheduling mode, a base station assigns a packet transmission duration to a mobile station. In the present invention, the packet transmission duration can be extended by $$N \times \text{reverse frame duration} + \alpha \qquad (1)$$

where N is the number of retransmission frames and reverse frame duration is the length of a frame transmitted from the mobile station to the base station. The reverse frame duration can be defined to be 20 ms in IS-2000 but it may vary depending on the length of a frame defined in a system used, $\alpha$ is a marginal transmission time including a propagation delay and a transmission delay.

According to the present invention, a channel duration assigned at an initial call setup can be extended in a system operating the reverse link by scheduling. For example, if reverse frames have errors, a base station requests a mobile station to retransmit the reverse frames, checking a duration assigned to the mobile station. If time is not sufficient for frame re-reception, the base station sets N to an intended value to extend the duration.

Figure 2:
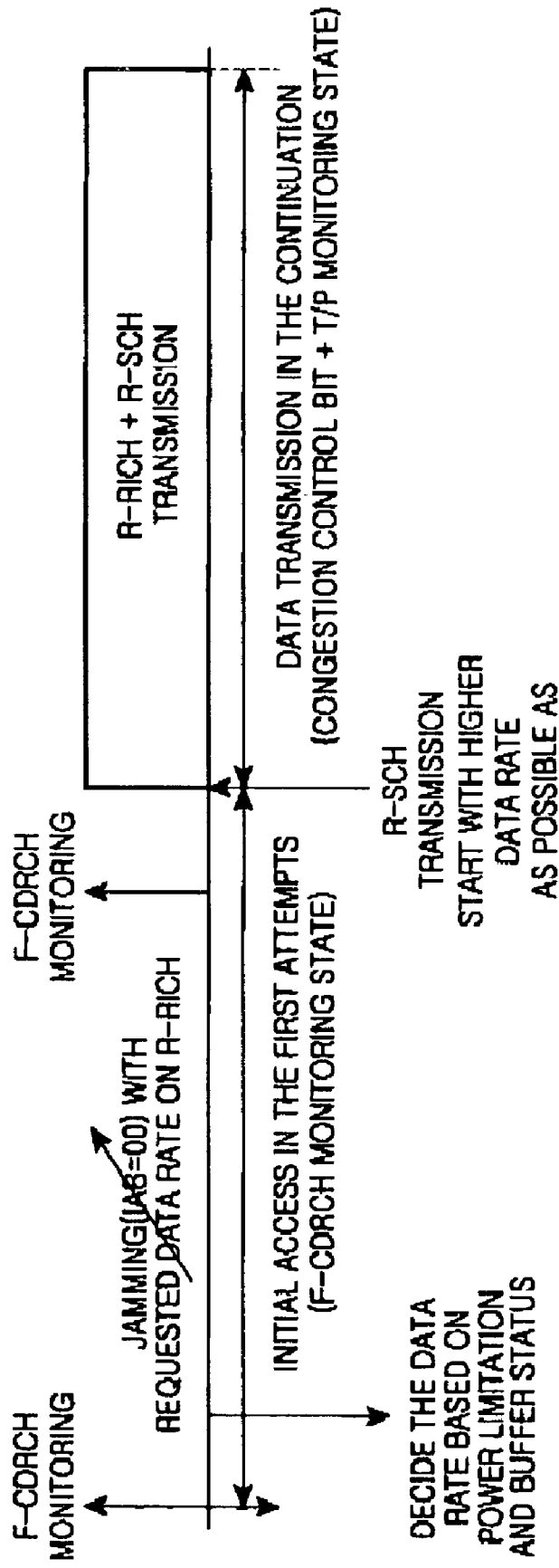
FIG. 2 illustrates basic reverse data transmission in a mobile communication system having F-CDRCH (Forward Common Data Rate Channel) proposed according to an embodiment of the present invention.

FIG. 2 illustrates basic reverse data transmission in a mobile communication system using the proposed F-CDRCH and the F-PANCH according to an embodiment of the present invention. Referring to FIG. 2, reverse data transmission according to the present invention is divided into a system access state (or an initial state) and a continuation state. In the system access state, an MS monitors the F-CDRCH and transmits a signal requesting a particular data rate lower than or equal to a maximum allowed data rate (MADR) set in the F-CDRCH, considering its power limit and buffer status. The signal is a jamming signal (or a probing signal) transmitted on an R-RICH. The jamming signal is defined by setting an IAB (Increase Available Bit) to 00 on the R-RICH. The IAB can be set to different values to define other functions as illustrated in Table 3.

TABLE 3

IAB = 00: jamming signal
(it indicates a required data rate for an R-SCH with the R-SCH not transmitted)
IAB = 01: increase request (measured by T/P, buffer status, etc.)
IAB = 10: decrease request (measured by T/P, buffer status, etc.)
IAB = 11: maintain (or increase over allowed data rate (rate limit))

In Table 3, when IAB=00, it defines the jamming signal. When the jamming signal is transmitted, the R-SCH transmits only information about a required data rate. When IAB=01, it indicates a data rate increase request. When IAB=10, it indicates a data rate decrease request. The increase or decrease of a data rate is determined according to a traffic-to-pilot ratio (T/P), a buffer status, etc. When IAB=11, it indicates a request for maintaining the current data rate or a request for a data rate increase over an MADR (or a data rate limit).

Returning to FIG. 2, upon successful initial access in the system access state, the MS transitions to the continuation state. In the continuation state, the MS monitors a CCB (Congestion Control Bit) of a forward congestion control sub-channel.

In the following description, reverse data transmission in the mobile communication system having the proposed channel structure according to the present invention is divided into initial data transmission in a system access state, data transmission in a continuation state, data retransmission, and data transmission at a handoff. First, the basic reverse transmission with the proposed channel structure will be described referring to FIG. 2. Then data transmission in the continuation state will be described referring to FIG. 3, followed by a description of each operation in the present invention with reference to FIGS. 4 to 7. It should be noted here that the present invention is applicable to 1x EV-DO as illustrated in FIG. 1, as well as 1x EV-DV.

A-1. Initial Data Transmission in a System Access State

The initial data transmission according to the present invention is carried out as follows.

(Step 1) A BS notifies an MS of an MADR on the F-CDRCH and the MS determines a data rate by monitoring the F-CDRCH at a data transmission point. The F-CDRCH can be transmitted periodically or sporadically. The BS determines an MADR according to its ROT (Rise Over Thermal), which depends on the data rates and transmission power of MSs within its cell, and broadcasts the MADR to the MSs on the F-CDRCH.

To prevent concurrent data transmission from a plurality of MSs at the same target data rate, the BS determines the MADR taking the power margins of the MSs into account, or frame boundaries being data access time points for the MSs by assigning persistence values to them. The concurrent data transmission from a plurality of MSs at the same data rate means that overshoot occurs due to a rapid increase in the ROT, and the persistence values are used for persistent tests according to the MADR. Instead of a persistence value, an access class value as used in IS-2000 can be used.

(Step 2) Considering the MADR set in the F-CDRCH and its power limit and buffer status, the MS determines an initial access data rate (IADR) by $$\text{data rate} = \min(\text{power limit}, F\text{-}CDRCH, \text{buffer status}) \quad (2)$$

(Step 3) After determining the IADR by Eq. (2), the MS transmits a jamming signal with IAB=00 and the determined data rate on the R-RICH to the BS. The BS determines the received signal as a jamming signal from IAB=00, determines an MADR considering the required data rate, and transmits the MADR to the MS in the next F-CDRCH frame.

When transmitting data on an R-SCH, the MS transmits IAB=11 and the data rate of the R-SCH on the R-RICH. The data rate is determined by comparing the MADR of the F-CDRCH monitored with its requested data rate. If the data rate broadcast in an F-CDRCH frame is equal to or, higher than the requested data rate, the MS starts to transmit data. This operation allows the MS to avoid data transmission at a minimum data rate at an initial transmission and to omit negotiations in a scheduling mode, thereby increasing transmission efficiency. After transmitting an IAB of 11, the MS can change the IAB to 10, 01, or 11 during continuous data transmission. An example will be given below.

TABLE 4

(Example)

MADR = 600 Kbps at frame t
MS 1: 300K request
MS 2: 200K request
MS 3: 200K request If an MADR in a frame t is 600 Kbps and an MADR is 250 K after the MSs transmit jamming signals in the example of Table 4, MS 2 and MS 3 start data transmission because the broadcast data rate is higher than their requested data rates. However, MS 1 rejects the broadcast data rate and reattempts system access because the broadcast data rate is lower than its requested data rate. Meanwhile, if a data rate determined according to an MADR set in the F-CDRCH and power limit is 9.6 Kbps, a minimum data rate or the R-SCH, the MS transmits data at the minimum data rate on the R-SCH with information about the data rate on the R-RICH without the need for transmitting a jamming signal.

(Step 4) In the case where the F-CDRCH does not allow the minimum data rate (i.e., 9.6 Kbps), the AT determines the next access time by persistence testing or transmits a channel assignment request message such as an SCRM (Supplemental Channel Request Message) or SCRMM (Supplemental Channel Request Mini Message), for scheduling-based channel assignment. In determining the next access time point for data transmission, an ACC mode value defined in the 1x system or a Grant message can be used. In response to the channel assignment request message from the MS, the BS transmits a Grant message illustrated in Table 5.

TABLE 5

Grant Message for SCH 1 and SCH 2

| Field | Length (bits) |
|---|---|
| MSG_TYPE | 3 |
| ACK_SEQ | 2 |
| MSG_SEQ | 2 |
| ACK_SEQ | 1 |
| One or two occurrences of the following three field records: | |
| REV_SCH_ID | 1 (may not be needed) |
| REV_SCH_DURATION | 4 |
| REV_SCH_START_TIME | 5 |
| REV_SCH_NUM_BITS_IDX | 4 |
| REV_SCH_LIMIT_RATE | 3 |
| RESERVED | XXX |

In Table 5, REV_SCH_ID is an identifier that identifies SCH 1 or SCH 2, REV_SCH_DURATION is the duration of SCH 1 or SCH 2, REV_SCH_START_TIME is the start time of SCH 1 or SCH 2, REV_SCH_NUM_BITS_IDX indicates the data rate of SCH 1 or SCH 2 in conjunction with the duration field, and REV_SCH_LIMIT_RATE is a maximum data rate available to SCH 1 or SCH 2.

The Grant message in Table 5 is used to assign SCH 1 and SCH 23 to an MS, independently. That is, when the MS requests SCH 1 and SCH 2 simultaneously, it is possible to assign different parameters for SCH 1 and SCH 2. In this case, a Grant message for SCH 1 precedes a Grant message for SCH 2.

A-2. Data Transmission in a Continuation State

Figure 3:
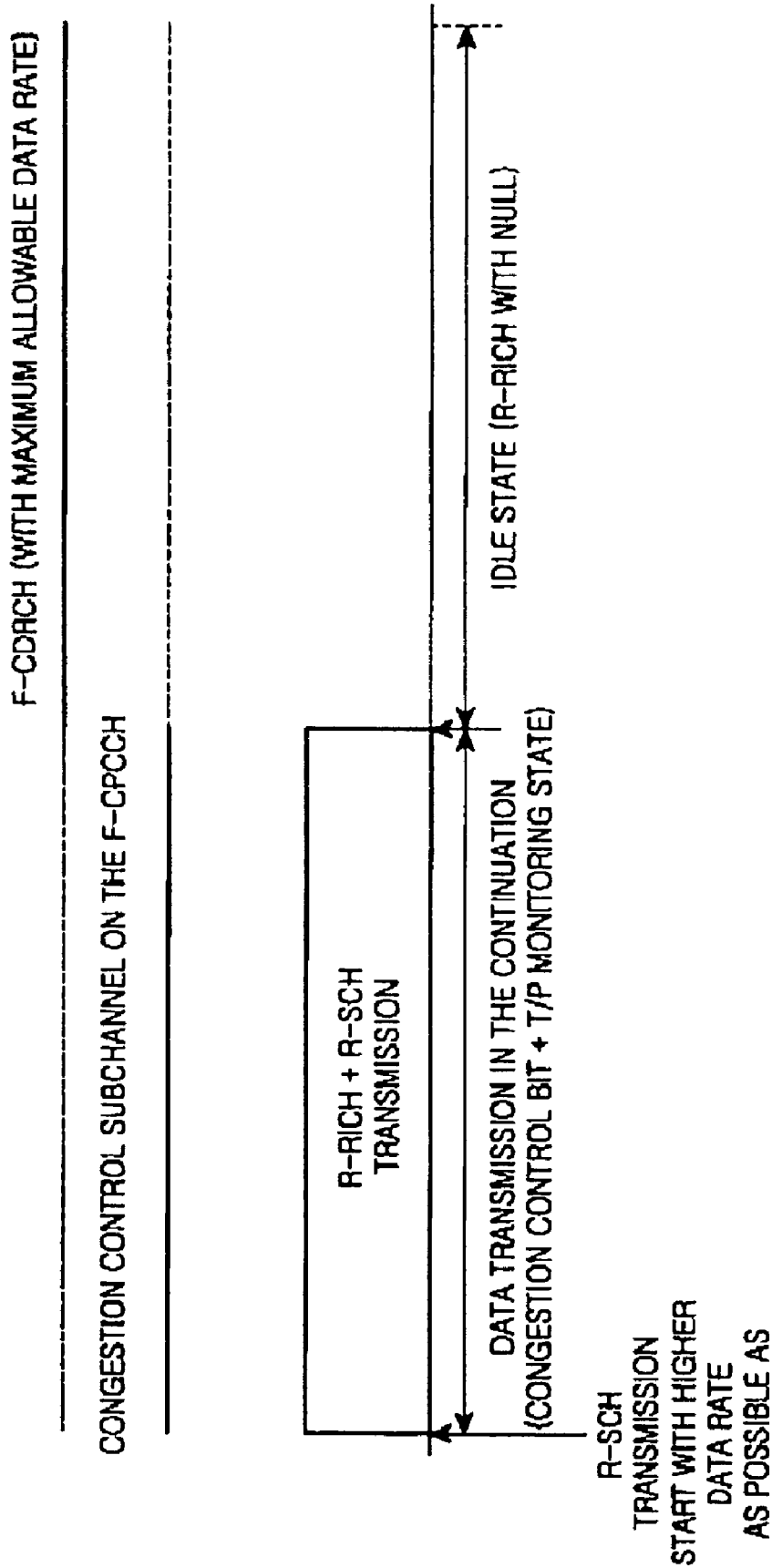
FIG. 3 illustrates reverse data transmission in a continuation state according to the embodiment of the present invention.

FIG. 3 illustrates data transmission in a continuation state according to the embodiment of the present invention.

According to the present invention, an MADR is limited by setting an RRL (Reverse Rate Limit) in an SCRM used in the 1x system. Hence, the MS sets its data rate to a data rate in a range from Null to the RRL including an assigned data rate according to a monitored T/P value. Here, the MS can make a fine power change according to a CCB within the allowed data rate range. If the MS requests a data rate higher than the current data rate within the allowable data rate range, it transmits IAB=01 to the BS. On the other hand, when the MS requests a data rate higher than the RRL, it transmits IAB=11 to the BS. Or the MS can be reassigned a data rate and an RRL by transmitting an SCRM to the BS. The transmission of an IAB=11 may cause a rapid change in the reverse data rate and the ROT of the BS due to the marginal power assigned to the MS. Therefore, the BS needs to reset a bandwidth assigned to the MS and its ROT with respect to the overall cell capacity. To notify the MS whether the data increase over the rate limit is allowed or not, the BS sets the CCB to Up or Down after receiving the IAB=11. If the CCB is Up, the MS transmits an R-SCH one frame (i.e., 20 ms) after transmitting the IAB=11 at the requested data rate. On the other hand, if the CCB is Down, the MS maintains its current data rate and transmission power.

A-3. Data Retransmission

It is preferable not to allow a data rate change, that is, an adaptive transmission at a data retransmission. Therefore, the present invention provides a method of increasing a retransmission success probability by allowing a change in power considering the current channel condition with a data rate for initial transmission maintained, and a method of increasing a combining gain at a receiver by retransmitting a plurality of frames (N frames).

According to the former method, a T/P and a CCB are parameters that control a power change at a data retransmission. A T/P change is the difference between a T/P at the previous frame transmission and a T/P at the current frame transmission. In Table 6 below, the number N of retransmission frames is assigned beforehand by a BS or determined according to the T/P change and the CCB. For example, if K successive Up-CCBs or Down-CCBs are received, N can be set.

TABLE 6

| T/P status | CCB status | Receiver Activity |
| --- | --- | --- |
| T/P Up | CCB Up | ReTx power up + Num of ReTx (1) |
| T/P Up | CCB Down | ReTx power down + Num of ReTx (N) |
| T/P Down | CCB Up | ReTx power up + Num of ReTx (N) |
| T/P Down | CCB Down | ReTx power down + Num of ReTx (N) |

According to the latter method, the BS determines the number of retransmission frames by information about the number of required retransmission frames with Nacks and notifies the MS of the determined number. When the BS operates in a scheduling mode, it can extend a channel duration assigned to the MS at an initial call setup by Eq. (1). In Eq. (1), $\alpha$ is a marginal transmission delay including a round trip delay.

A-4. Data Transmission in a Handoff Zone

Data transmission in a handoff zone is carried out according to $$\text{Data rate for initial access} = \min(\text{power limit}, \min(F\text{-}CDRCH[i])) \quad (3)$$

In, a handoff zone, the MS monitors at least two F-CDRCHs and compares a minimum MADR offered by the F-CDRCHs with the power limit of the MS. Then the MS transmits a jamming signal to a BS offering the minimum MADR. The MS transmits data to the BS at a data rate determined according to the MADR of an F-CDRCH from the BS.

B. Embodiments of Reverse Data Transmission

Figure 4:
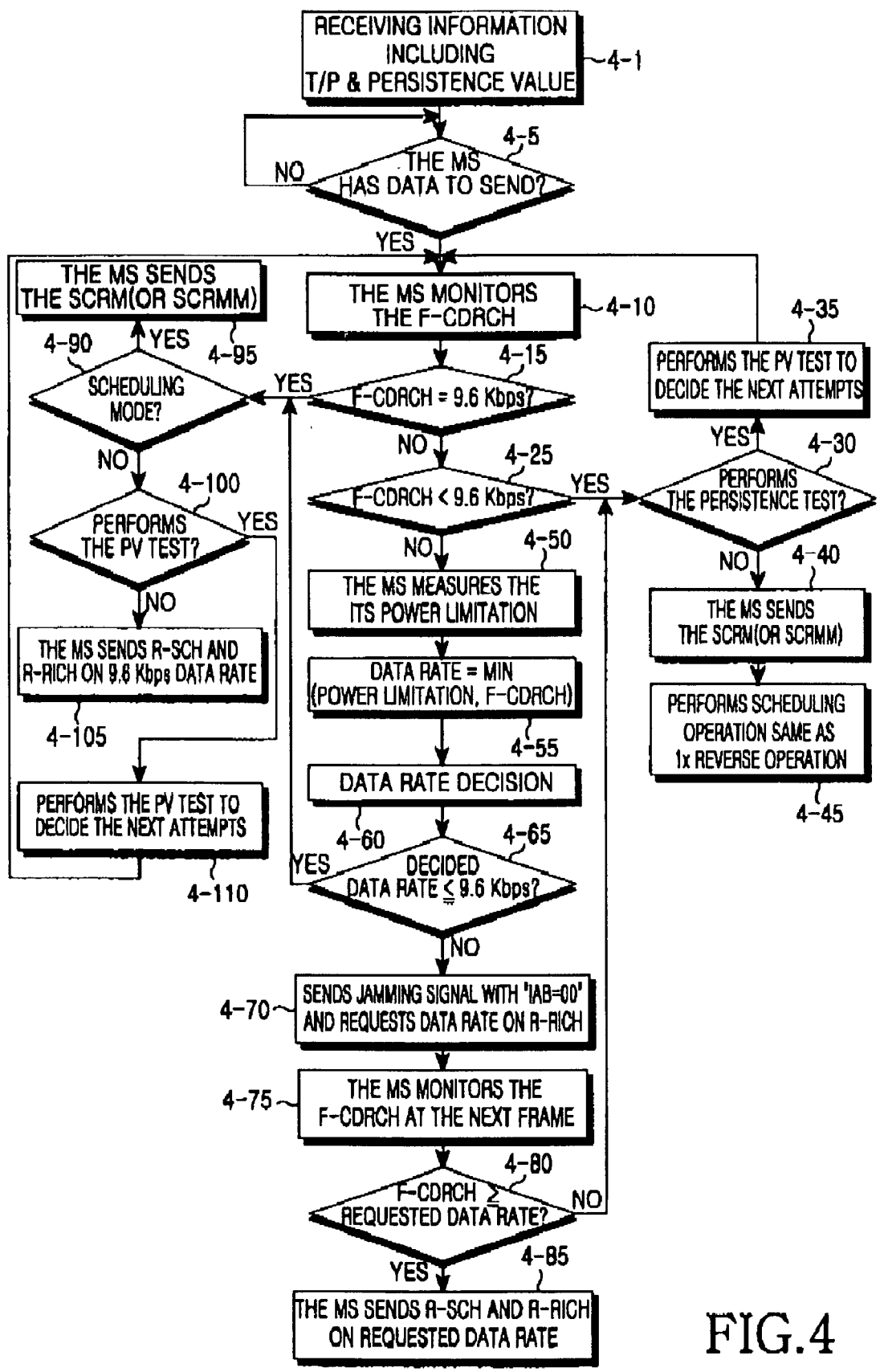
FIG. 4 is a flowchart illustrating initial data transmission in an MS according to the embodiment of the present invention.

FIG. 4 is a flowchart illustrating an initial reverse data transmission in a system access state according to the embodiment of the present invention. Referring to FIG. 4, an MS receives data rate-related information including a persistence value and a T/P from a BS in step 4-1 and determines whether it has data to transmit in step 4-5. In the presence of transmission data, the MS proceeds to step 4-10 and in the absence of transmission data, it repeats step 4-5. In step 4-10, the MS receives an MADR from the BS by monitoring an F-CDRCH. The MS checks the MADR in step 4-15. If the MADR is the lowest data rate 9.6 Kbps available in the system, the MS proceeds to step 4-90. If the MADR is not 9.6 Kbps, the MS goes to step 4-25. In step 4-90, the MS determines whether it operates in a scheduling mode. If it does, the MS transmits an SCRM or SCRMM to the BS in step 4-95 and carries out a reverse data transmission in the conventional manner for IS-2000. On the other hand, if it is determined that the MS does not operate in a scheduling mode in step 4-90, the MS determines whether to perform a persistence test (PV test) in step 4-100. If the MS determines to perform the PV test, it performs the PV test to determine the next access time in step 4-110. If the MS determines not to perform the PV test, it transmits data on an R-SCH at 9.6 Kbps in step 4-105.

If the MADR is lower than 9.6 Kbps in step 4-25, the MS determines whether to perform a PV test in step 4-30. If the MS determines to perform the PV test, it performs the PV test to determine the next access time for data transmission in step 4-35 and returns to step 4-10. If the MS determines not to perform the PV test in step 4-30, it transmits an SCRM or SCRMM to the BS in step 4-40 and awaits a channel assignment message as in IS-2000 in step 4-45. A Grant message as a channel assignment message is constructed as illustrated in Table 5 according to the present invention.

If the MADR is higher than 9.6 Kbps in step 4-25, the MS measures its maximum available transmission power in step 4-50 and determines a data rate by comparing the MADR with its power limit in step 4-55. Though not depicted in FIG. 4, the MS may consider its transmission buffer status in determining the data rate as in Eq. (2).

If the determined data rate is equal to or lower than 9.6 Kbps in step 4-65, the MS goes to step 4-90. If the data rate is higher than 9.6 Kbps, the MS transmits an R-RICH with an IAB of 00 and the determined data rate set to the BS in step 4-70. The R-RICH signal is a jamming signal. The MS monitors the F-CDRCH in the next frame in step 4-75 and compares an MADR set in the F-CDRCH with the determined data rate, that is, the IADR in step 4-80. If the MADR is equal to or higher than the IADR, the MS transmits data on the R-SCH at the IADR in step 4-85. On the other hand, if the MADR is lower than the IADR in step 4-80, the MS goes to step 4-30.

Figure 5A:
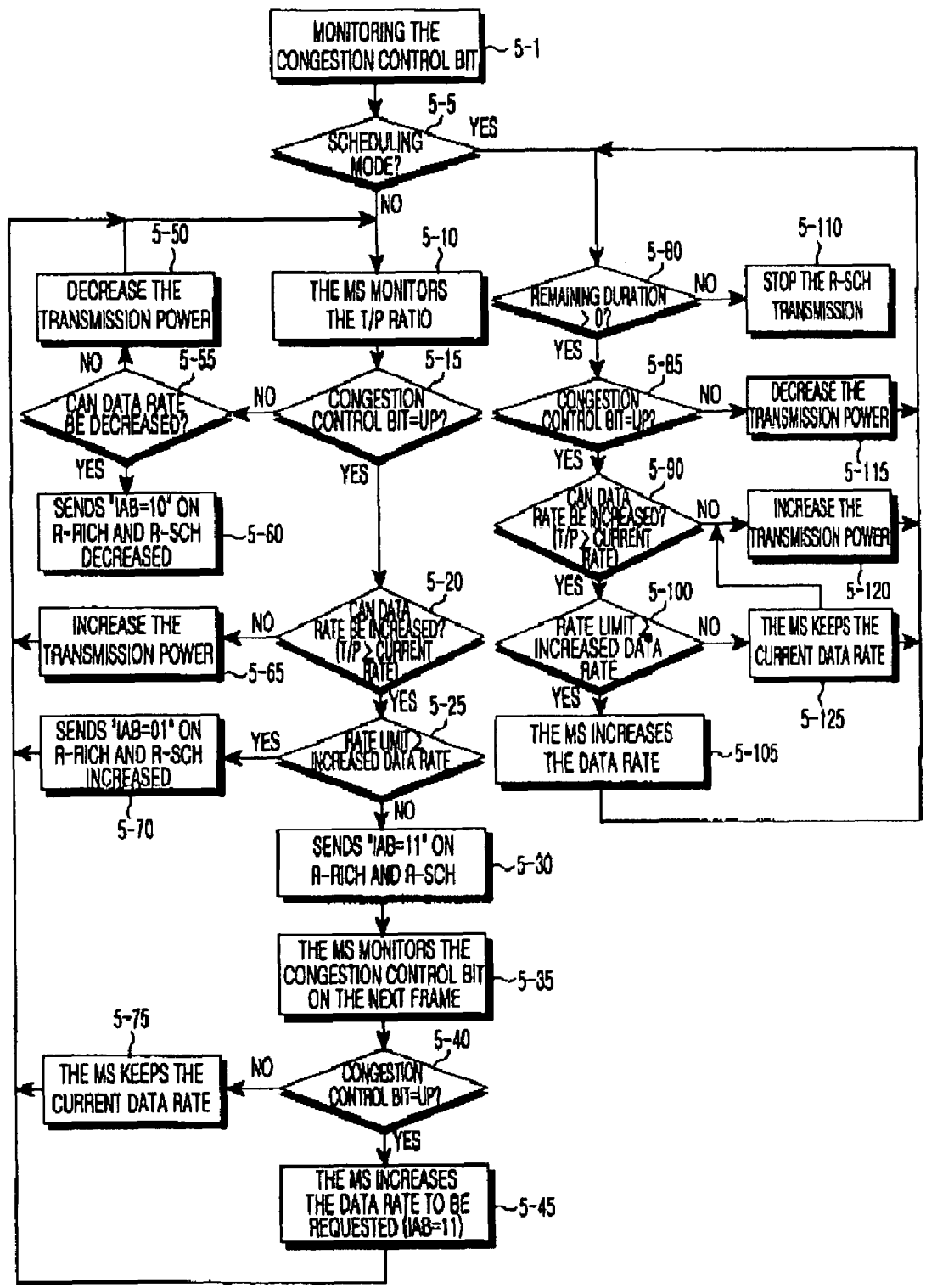
FIG. 5A is a flowchart illustrating an embodiment of data transmission at a continuation transmission in the MS according to the present invention.

FIG. 5A is a flowchart illustrating an embodiment of a reverse data transmission in a continuation state according to the present invention. Referring to FIG. 5A, the MS monitors a CCB on a congestion control subchannel from the BS in step 5-1 and determines whether it operates in a scheduling mode in step 5-5. If it does, the MS determines whether its duration assigned from the BS has elapsed in step 5-80. If the duration is 0, the MS discontinues data transmission on the R-SCH in step 5-110. If data transmission is in progress, that is, the duration is not 0, the MS measures the CCB in step 5-85. If the CCB is Down, the MS reduces its current transmission power in step 5-115 and returns to step 5-80. On the other hand, if the CCB is Up, the MS determines whether its data rate can be increased in step 5-90. In step 5-90, the MS measures the T/P of the BS and compares a data rate mapped to the T/P with the current data rate in step 5-90. If the current data rate is higher than the T/P-based data rate, the MS simply increases its transmission power in step 5-120. On the contrary, if the current data rate is equal to or lower than the T/P-based data rate, the MS compares an RRL (Reverse Rate Limit) set by the BS with the T/P-based data rate in step 5-100. If the RRL is higher than or equal to the T/P-based data rate, the MS increases the current data rate to the T/P-based data rate and transmits data on the R-SCH at the increased data rate in step 5-105. If the RRL is lower than the T/P-based data rate, the MS maintains the current data rate in step 5-125 and increases its transmission power in step 5-120.

Meanwhile, if the MS does not operate in the scheduling mode in step 5-5, it monitors the T/P continuously in step 5-10 and checks the CCB in step 5-15. If the CCB is Down, the MS determines whether its current data rate can be decreased in step 5-55. If a data rate decrease is not available, the MS simply reduces its transmission power in step 5-50. If a data rate decrease is available, the MS transmits the R-RICH with an IAB set to 10 and the R-SCH at a decreased data rate in step 5-60.

If the CCB is Up in step 5-15, the MS determines whether a data rate increase is available by comparing the current data rate with a data rate mapped to the T/P in step 5-20. If a data rate increase is not available, the MS simply increases the transmission power in step 5-65. If a data rate increase is available, that is, the T/P-based data rate is higher than or equal to the current data rate, the MS compares the T/P-based data rate with the RRL in step 5-25. If the RRL is higher than or equal to the T/P-based data rate, the MS transmits the R-RICH with an IAB set to 01 and transmits data on the R-SCH at the T/P-based data rate in step 5-70.

On the contrary, if the T/P-based data rate is higher than the RRL, the MS transmits the R-RICH with an IAB set to 11 and data on the R-SCH at the current data rate in step 5-30. In step 5-35, the MS monitors the CCB. If the CCB is Up in step 5-40, the MS increases the current data rate to the T/P-based data rate, considering that a data rate increase over the TTL is allowed, and transmits data on the R-SCH on the increased data rate in step 5-45. If the CCB is Down, the MS transmits data on the R-SCH at the current data rate in step 5-75.

Figure 5B:
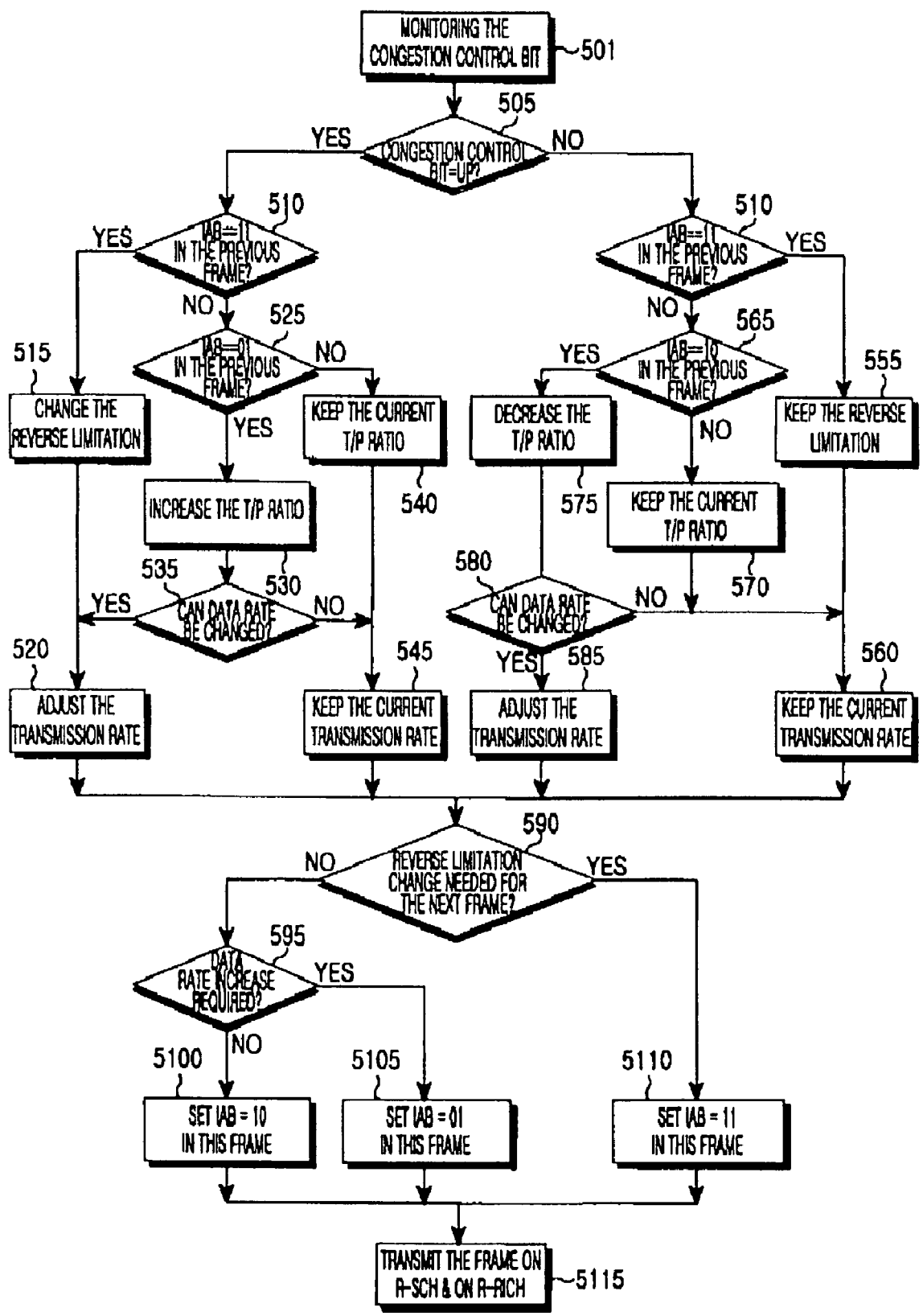
FIG. 5B is a flowchart illustrating another embodiment of data transmission at a continuation state in the MS according to the present invention.

FIG. 5B is a flowchart illustrating another embodiment of a reverse data transmission in a continuation state according to the present invention. In this embodiment, the MS does not operate in a scheduling mode and thus the reverse data transmission is controlled by the CCB.

Referring to FIG. 5B, the MS monitors the CCB in step 501 and checks the CCB in step 505. If the CCB is Up in step 505, the MS checks whether an IAB transmitted in the previous frame is 11 in step 510. If the IAB is 11 in step 510, the MS increases an RRL as ordered by the BS in step 515 and increases the current data rate to a data rate lower than or equal to the increased RRL in step 520. If the IAB is not 11, the MS determines whether the IAB is 01 in the previous frame in step 525. If the IAB is 01, the MS increases a T/P in step 530 and determines whether a data rate increase is required according to the increased T/P in step 535. If the data rate increase is required, the MS increases the current data rate to a data rate equal to or lower than the RRL in step 520. On the other hand, if a data rate increase is not required in step 535, the MS maintains the current data rate in step 545. If the IAB is not 01 in step 525, which implies that the IAB is 10 or 00, the MS maintains the current T/P in step 540 and maintains the current data rate in step 545.

If the CCB is Down in step 505, the MS the MS checks whether the IAB is 11 in step 550. If the IAB is 11, the MS maintains the current RRL in step 555 and maintains the current data rate in step 560. If the IAB is not 11, the MS determines whether the IAB is 10 in step 565. If the IAB is not 10, which implies that the IAB is 01 or 00, the MS maintains the current T/P in step 570 and maintains the current data rate in step 560. If the IAB is 10, the MS decreases the T/P in step 575 and determines whether a data rate decrease is required according to the decreased T/P in step 580. If the data rate decrease is required, the MS decreases the current data rate in step 585. On the other hand, if a data rate decrease is not required in step 580, the MS maintains the current data rate in step 560.

However, if the data rate of the MS is limited by its battery or the MS has data remaining in its transmission buffer, the MS selects a data rate limited by the battery equal to or lower than the determined data rate, or a T/P and a data rate high enough to transmit the buffered data in steps 501 to 585.

After controlling the RRL, T/P, and data rate in steps 501 to 585, the MS determines whether to increase the current RRL in step 590. If an RRL increase is not required, the MS determines whether a data rate increase is required in step 595. If a data rate increase is not required, that is, the data rate can be decreased, the MS sets an IAB to 10 in step 5100. If a data rate increase is required in step 595, the MS sets the IAB to 01 in step 5105. If an RRL increase is required in step 590, the MS sets the IAB to 11 in step 5110.

After the IAB is set in steps 590 to 5110, the MS transmits reverse data on the R-SCH at the set data rate, and the set IAB and a rate index indicating the current data rate on the R-RICH to the BS in step 5115.

Figure 6:
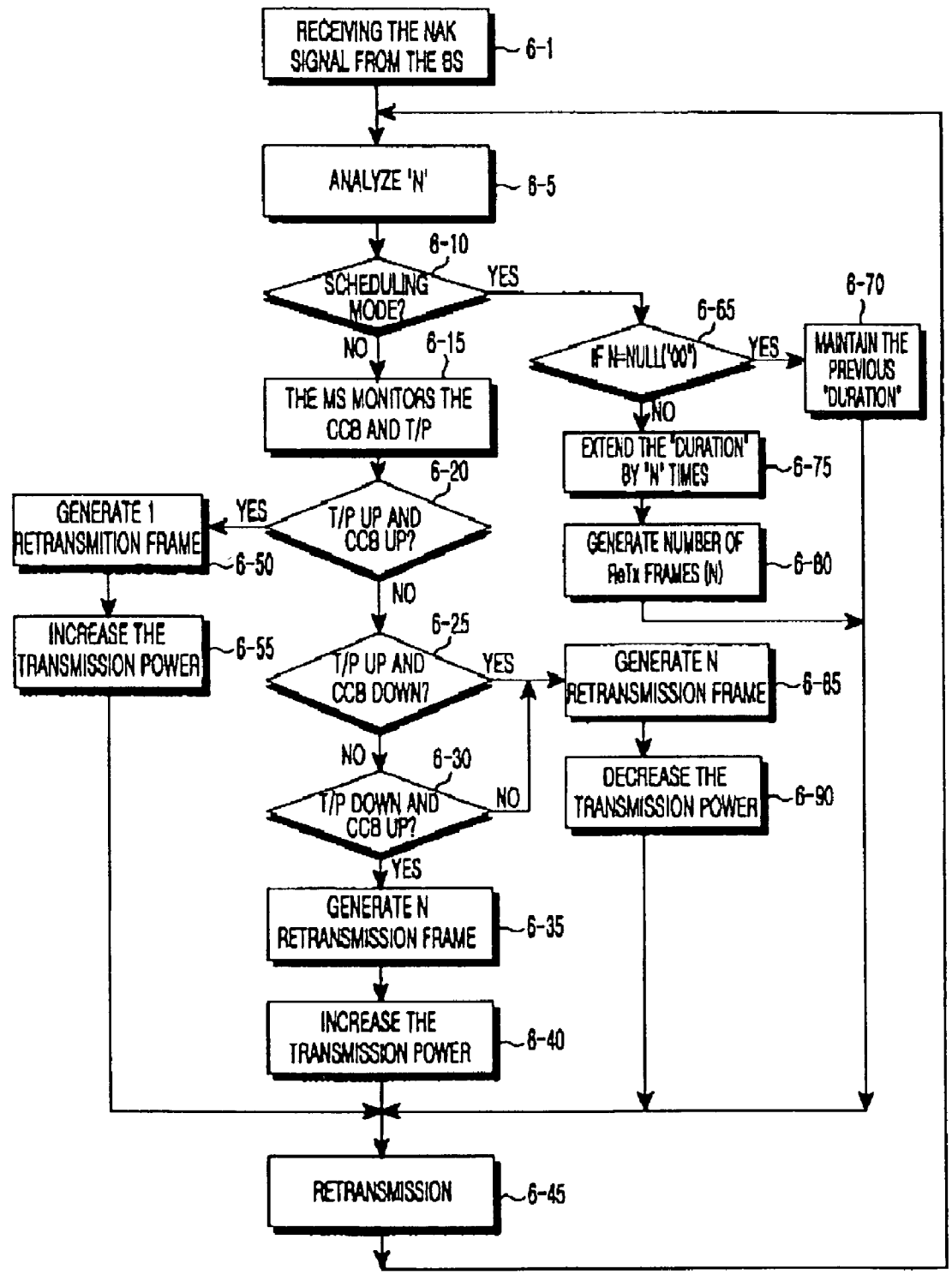
FIG. 6 is a flowchart illustrating data retransmission in the MS according to the embodiment of the present invention.

FIG. 6 is a flowchart illustrating reverse data retransmission according to the embodiment of the present invention. Referring to FIG. 6, the MS receives a feedback signal (i.e., an Ack or a Nack) on the F-PANCH from the BS in step 6-1. For ease of description, the MS will only receive a Nack in this description. In step 6-5, the MS analyzes N received along with the feedback information. As stated before, N is the number of retransmission frames. In a scheduling mode, N functions to extend a duration assigned to the MS.

In a scheduling mode (step 6-10), the MS proceeds to step 6-65. In step 6-65, if N=00, that is, N is Null in step 6-65, which implies that the duration assigned to the MS is not extended, the MS maintains the duration in step 6-70 and retransmits one frame in step 6-45. In a Nack-based retransmission system, a receiver transmits feedback information to a transmitter even when it has received data successfully. In this case, N is set to 00. If N is not Null in step 6-65, the MS increases the assigned duration by N times in step 6-75. for example, if N is 2, the MS increases the duration by (2×frame duration+α). The MS generates N retransmission frames in step 6-80 and transmits the retransmission frames to the BS in step 6-45.

If the MS determines that it does not operate in a scheduling mode in step 6-10, it goes to step 6-15. In this case, the reverse link operates autonomously and thus the process of exchanging a channel assignment request message and a Grant message between an MS and a BS can be omitted. The MS monitors a T/P and a CCB in step 6-15. If both the T/P and the CCB are Up in step 6-20, which implies that the T/P at a retransmission time has increased from the previous transmission time and the CCB received from the BS has also increased, the MS generates one retransmission frame in step 6-50, increases its transmission power in step 6-55, and transmits the retransmission frame in step 6-45. If the T/P is Up and the CCB is Down in step 6-25, the MS determines the number of retransmission frames according to N in step 6-85, decreases the transmission power in step 6-90, and transmits retransmission frames in step 6-45. If the T/P is Down and the CCB is Up in step 6-30, the MS goes to step 6-85. If the T/P is Down and the CCB is Down, the MS generates N retransmission frames in step 6-35, increases the transmission power in step 6-40, and transmits the retransmission frames in step 6-40.

Figure 7:
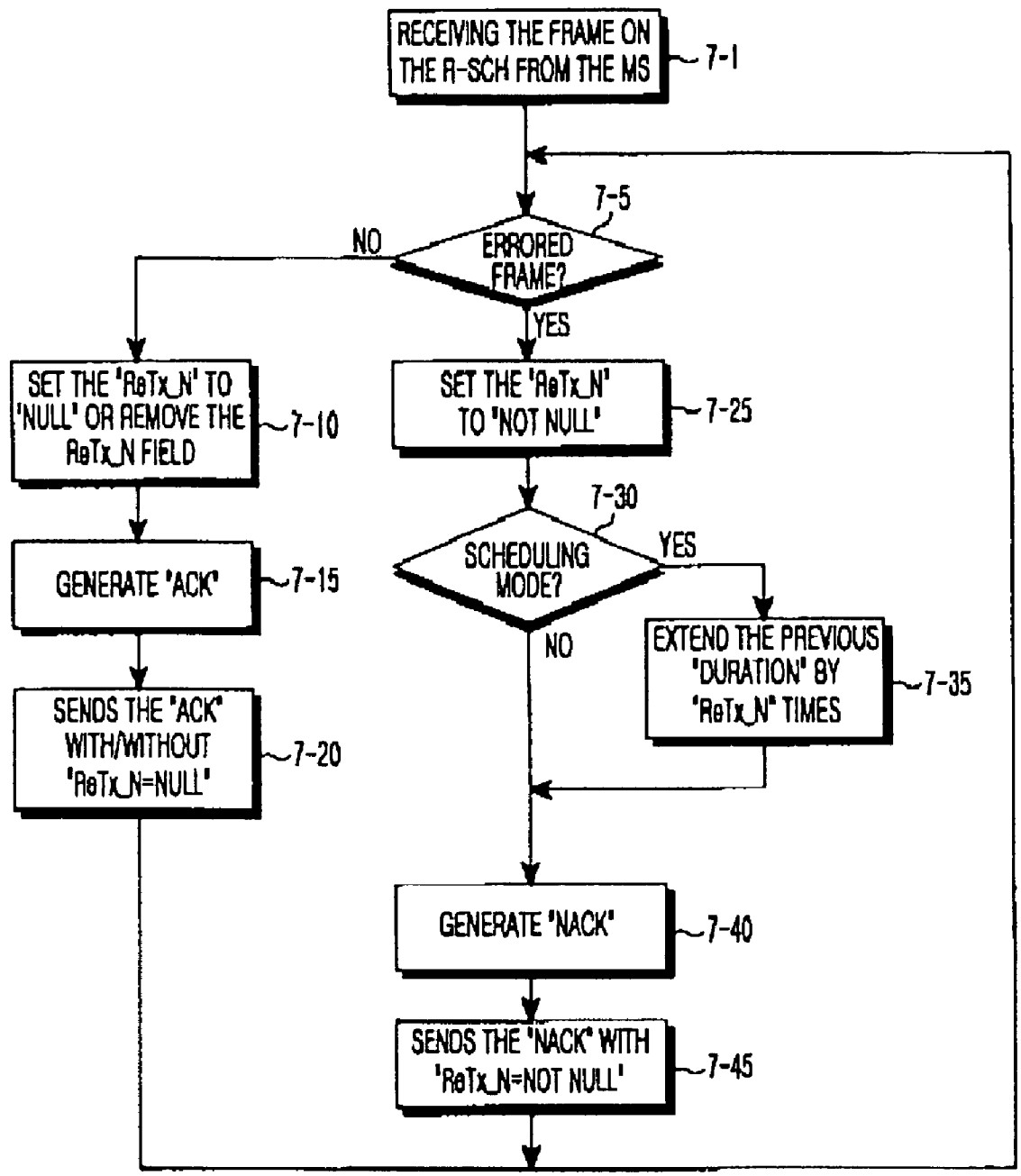
FIG. 7 is a flowchart illustrating an operation in a BS for reverse data retransmission according to the embodiment of the present invention.

FIG. 7 is a flowchart illustrating a BS operation related with a reverse data retransmission according to the embodiment of the present invention. Referring to FIG. 7, a BS receives a frame on an R-SCH from an MS in step 7-1 and determines whether the received frame has errors in step 7-5. If the frame has no errors, the BS sets ReTx_N to Null in feedback information in step 7-10, generates Ack in step 7-15, and transmits ReTx_N=Null and Ack to the MS on an F-PANCH in step 7-20. Or the BS can transmit only Ack in step 7-20.

On the other hand, if the received frame has errors, the BS sets ReTx_N to a value other than Null in step 7-25. ReTx_N may be set in various ways. Considering errors in successive frames, ReTx_N can be set to at least 2. If ReTx_N=1, the BS performs a retransmission request operation in the conventional retransmission method. In step 7-30, the BS determines whether the MS operates in a scheduling mode. If it does, the BS extends a duration assigned to the MS by ReTx_N and sets a marginal transmission time as α in step 7-35. Then the BS generates a Nack in step 7-40 and transmits ReTx_N along with the Nack to the MS in step 7-45. If the MS does not operate in a scheduling mode in step 7-30, the BS performs steps 7-40 and 7-45 directly.

Figure 8:
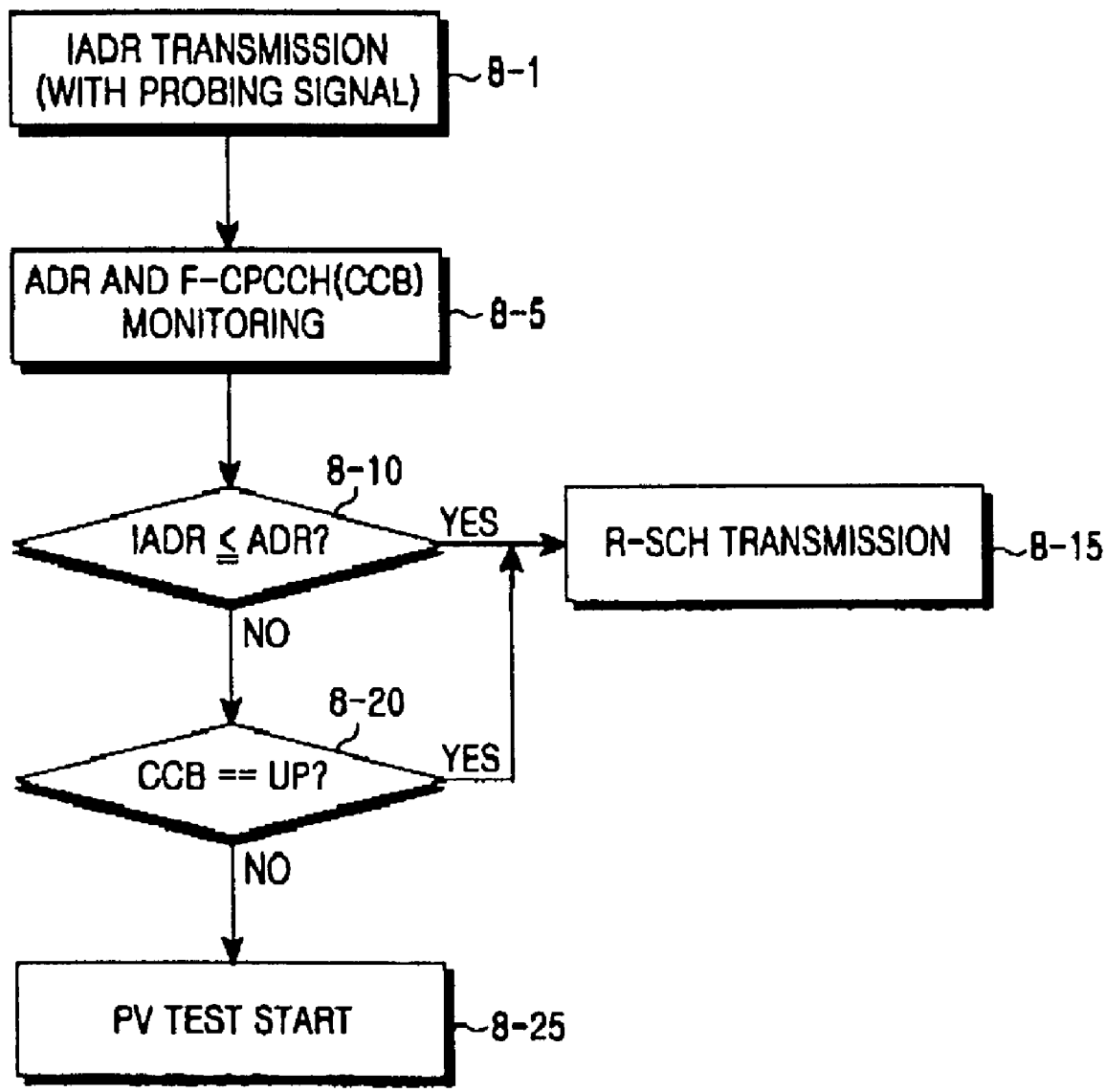
FIG. 8 is a flowchart illustrating a control operation in the MS for selective reverse data transmission according to another embodiment of the present invention.
Figure 9:
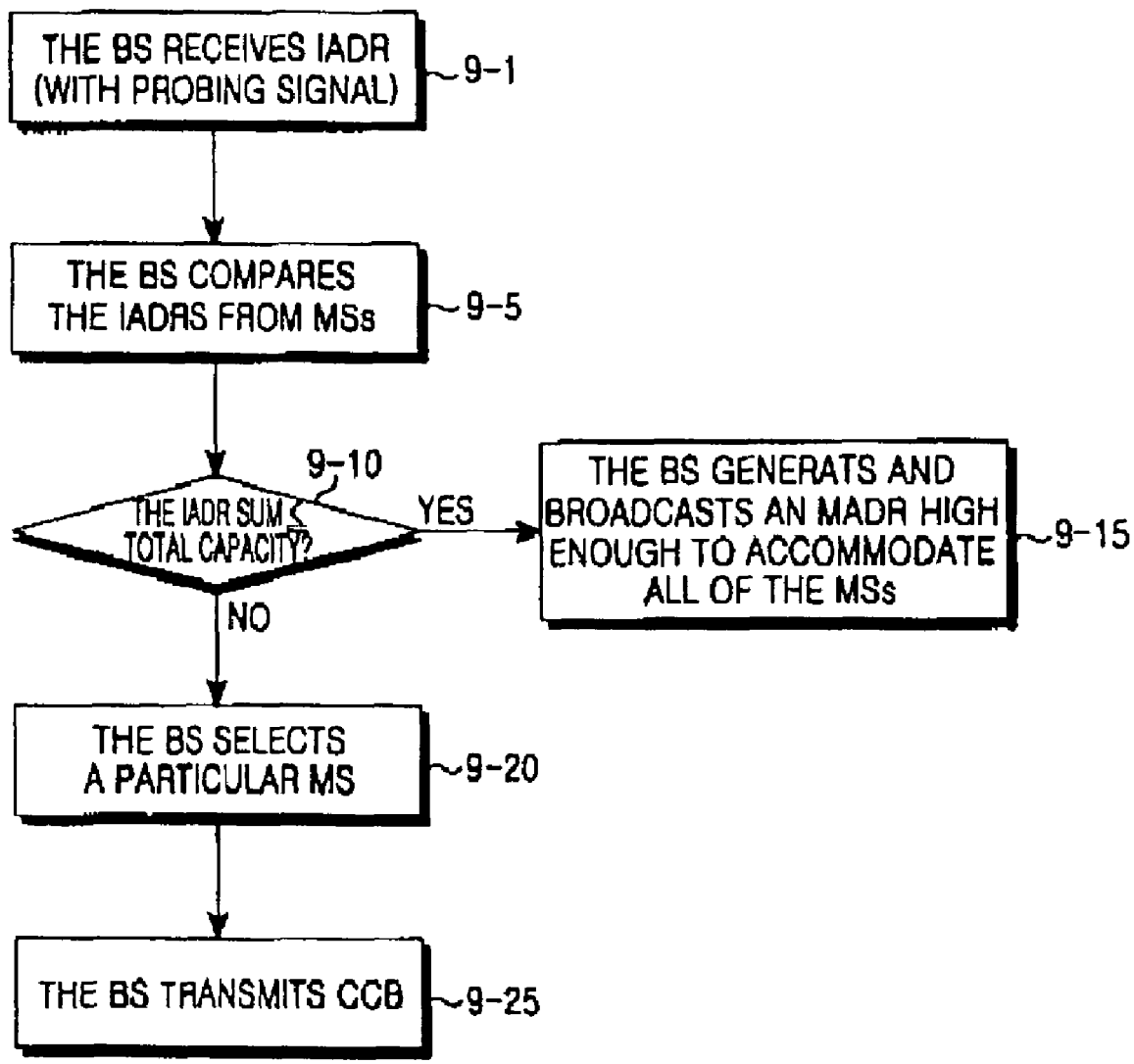
FIG. 9 is a flowchart illustrating a control operation in the BS for selective reverse data transmission according to the second embodiment of the present invention.

FIGS. 8 and 9 illustrate a reverse data transmission according to another embodiment of the present invention.

First, a description will be made of a basic selective MS controlling operation in a BS.

(1) When an MS transmits a probing signal to the BS in an initial access state, the MS monitors an MADR on an F-CDRCH and a CCB on an F-CPCCH (Forward Common Power Control Channel) simultaneously to determines whether the probing signal has been transmitted successfully.

(2) Even though the MADR is lower than its requested initial access data rate (IADR), if the MS receives a predetermined CCB pattern or successive same CCB patterns (e.g., CCB=Up in the present invention), it transmits data on an R-SCH at the requested data rate, considering the initial access is successful.

(3) The BS transmits an Up-CCB or a Down-CCB to indicate the success or failure of the probing signal on the F-CPCCH. It can be further contemplated as an embodiment that successive CCBs or a dominant CCB received in an MADR receiving period is set to indicate the success or failure of the probing signal.

The above selective control of reverse data transmission will now be described separately on a BS side and on an MS side.

(BS operation)
(a) The BS transmits the F-CDRCH and the F-CPCCH to MSs within its cell.
(b) If at least two MSs transmit probing signals requesting the same data rate and the BS cannot allow the data rate for all the MSs, it transmits an Accept signal on the F-CPCH to a particular MS.
(c) The BS notifies the particular MS that the requested data rate is accepted by transmitting an Up-CCB to the MS on the F-CPCCH.

(MS operation)
If an MADR received on the F-CDRCH after transmission of a probing signal is lower than its requested data rate (i.e., IADR), the MS monitors the F-CDRCH in its assigned slots. If a CCB is Up, the MS transmits data on an R-SCH at the requested data rate, considering that the probing signal is accepted.

The selective MS control operation in the BS will be described below in more detail.

FIG. 8 is a flowchart illustrating a control operation in an MS for a selective control of reverse data transmission according to the second embodiment of the present invention. Referring to FIG. 8, the MS transmits a probing signal with an IAB of 00 and its requested IADR to a BS according to an MADR received from the BS in step 8-1 and monitors an MADR on an F-CDRCH and a CCB on an F-CPCCH from the BS in step 8-5 to determines whether its access is successful. The MS compares the MADR with the IADR in step 8-10. If the MADR is higher than or equal to the IADR, the MS transmits data on an R-SCH at the IADR in step 8-15.

On the other hand, if the MADR is lower than the IADR, the MS checks the CCB to determine whether its access is successful or not in step 8-20. Despite an MADR lower than an IADR, a reception of an Up-CCB indicates a successful initial access in this embodiment. If the CCB is Up in step 8-20, the MS goes to step 8-15. If the CCB is Down in step 8-15, which indicates an access failure, the MS performs a PV test to determine the next access time in step 8-25.

FIG. 9 is a flowchart illustrating a control operation in a BS for a selective control of reverse data transmission according to the second embodiment of the present invention. Referring to FIG. 9, the BS receives IADRs from MSs within its cell in step 9-1. When the BS receives a probing signal with an IAB set to 00, it determines that it is an IADR. Then, the BS compares the IADRs and sums them in step 9-5 and compares the IADR sum with its total MADR capacity in step 9-10. If the total MADR capacity is greater than or equal to the IADR sum, the BS generates an MADR high enough to accommodate all of the MSs and broadcasts the MADR to the MSs in step 9-15.

On the other hand, if the total MADR capacity is less than the IADR sum, the BS selects a particular MS according to the class of the MS, the amount and characteristics of reverse data, and fairness in step 9-20. In other words, the BS accepts the IADR of the selected MS.

In step 9-25, the BS transmits an Up-CCB to the selected MS to notify it that its IADR is accepted. The BS also transmits a Down-CCB to the other MSs of which the initial accesses are not accepted.

C. Data Transmission Apparatus

Figure 10:
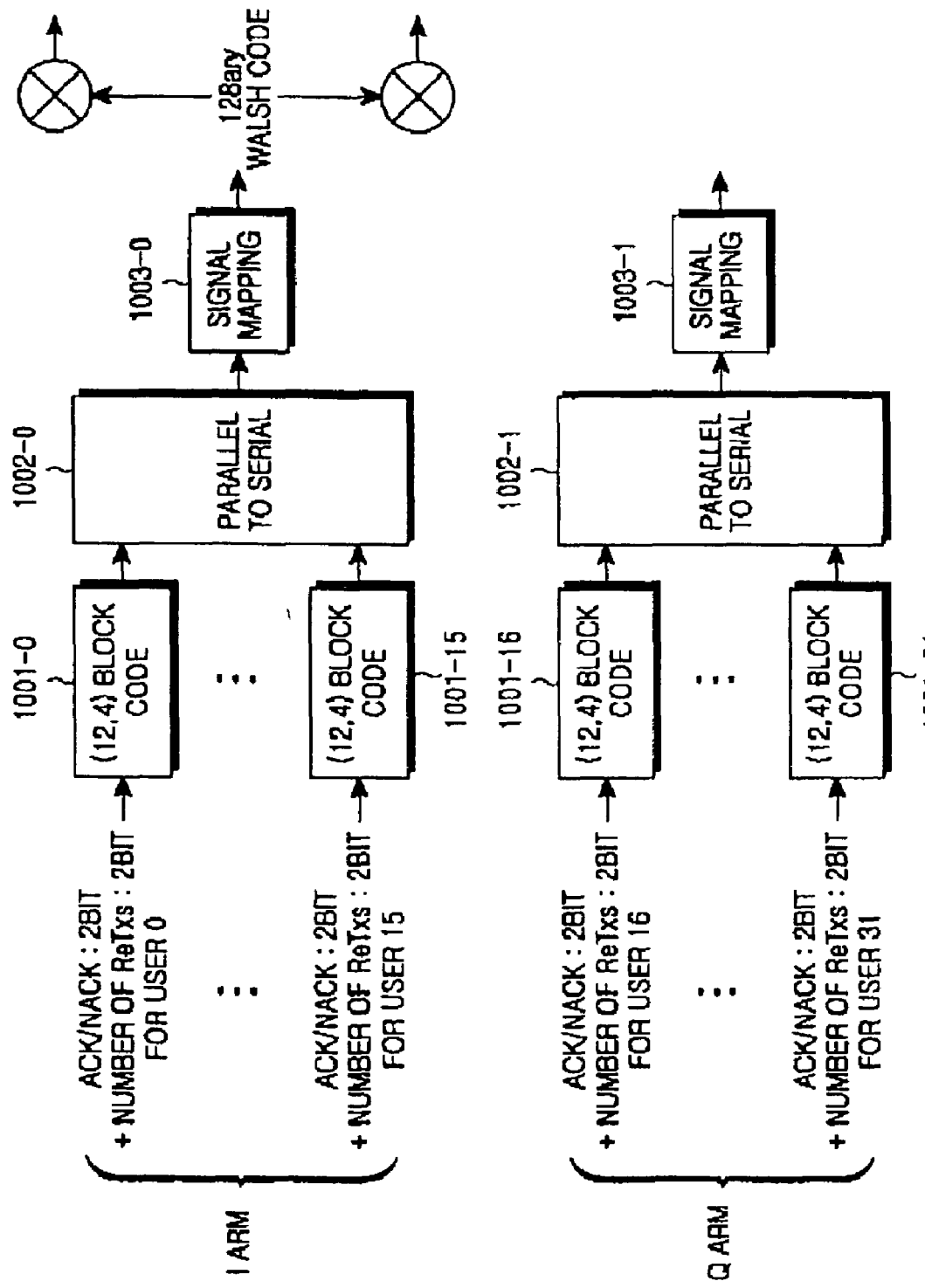
FIG. 10 is a block diagram of an F-PANCH transmitter according to the present invention.

FIG. 10 is a block diagram of an F-PANCH transmitter according to the present invention. The F-PANCH delivers information indicating whether an R-SCH 1 and an R-SCH 2 are to be retransmitted and the number of retransmission frames. An MS determines whether R-SCHs are to be retransmitted and how many frames are to be retransmitted by recovering 2-bit Ack/Nack feedback information and information about the number of retransmission frames, as directed to the MS. Transmission/reception of the F-PANCH is applicable in the same manner to other systems as well as 1x EV-DV.

Referring to FIG. 10, a BS transmits 4-bit F-PANCH information to each of the MSs within its cell to indicate whether R-SCHs 1 and R-SCHs 2 are to be retransmitted and how many frames are to be retransmitted. The F-PANCH transmitter can transmit the F-PANCH information to up to 32 MSs. F-PANCH information for 16 MSs #0 to #15 is transmitted as I-arm information, and F-PANCH information for the other 16 MSs #16 to #32 is transmitted as Q-arm information. An MS is identified by its transmission position and reception of F-PANCH information as I-arm or Q-arm information. The BS notifies each MS of its identification information at a call setup by signaling.

Since the I-arm structure is identical to the Q-arm structure, only the former will be described. Each of (12, 4) block encoders 1001-0 to 1001-15 channel-encodes 4-bit F-PANCH information and outputs 12 code symbols. A parallel to serial converter 1002-0 converts 192 sets of 16 parallel code symbols output from the (12, 4) block encoders 1001-0 to 1001-15 to a serial signal. A signal mapper 1003-0 maps the serial signal. The mapped signal is orthogonally spread and transmitted. For example, an orthogonal spreading code of length 128 can be used.

While 4-bit F-PANCH information is encoded with a (12, 4) block code in the above description, (6, 4), (24, 4), or other block codes can be applied. In the case of a (6, 4) block code, one F-PANCH supports 64 MSs. In the case of a (24, 4) block code, one F-PANCH supports 16 MSs. The code rate of a block code is determined according to F-PANCH performance requirements and the length of available orthogonal codes.

Figure 11:
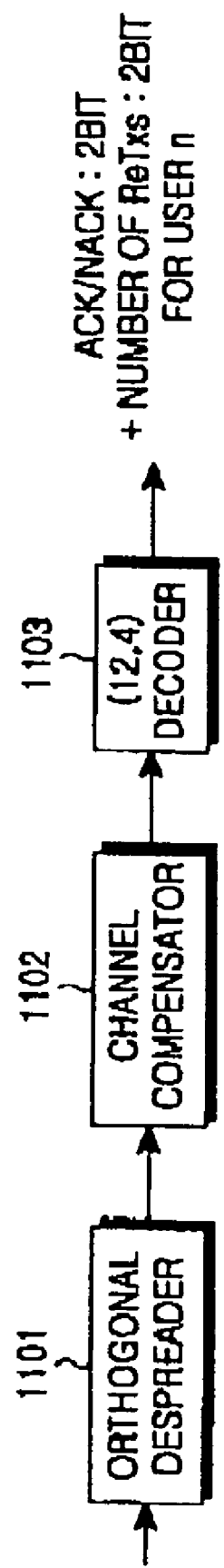
FIG. 11 is a block diagram of an F-PANCH receiver according to the present invention.

FIG. 11 is a block diagram of an F-PANCH receiver in an MS for receiving forward Ack/Nack feedback information from a BS according to the present invention. The F-PANCH receiver is the counterpart of the F-PANCH transmitter illustrated in FIG. 10.

Referring to FIG. 11, a received signal is orthogonally spread in an orthogonal despreader 1101 and channel-compensated in a channel compensator 1102. Then, the channel-compensated signal is decoded in a (12, 4) decoder 1103. Thus the F-PANCH information transmitted from the BS is recovered. That is, 2-bit information about whether SCH 1/SCH 2 is to be retransmitted and 2-bit information about the number of retransmission frames are recovered.

Figure 12:
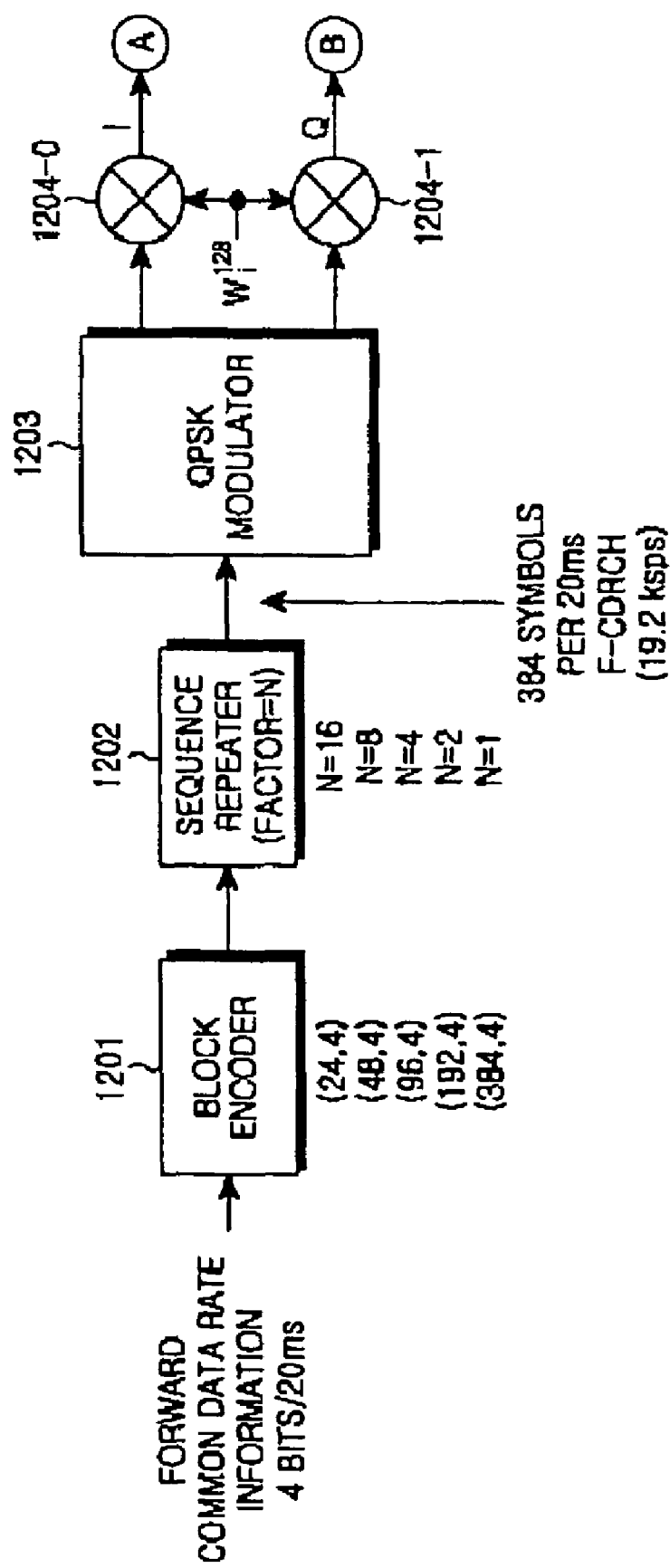
FIG. 12 is a block diagram of an F-CDRCH transmitter according to the present invention.

FIG. 12 is a block diagram of an F-CDRCH transmitter according to the present invention. A BS transmits an MADR on an F-CDRCH to an MS periodically in order to enable the MS to efficiently determine an IADR in a 1x EV-DV system.

The MS attempting data transmission on a reverse packet data channel (e.g., R-SCH 1/R-SCH 2) determines its IADR based on the MADR, its buffer status, and its power margin and transmits the IADR on an R-RICH to the BS. The MS continuously monitors the F-CDRCH. If an MADR set in the F-CDRCH is higher than or equal to the IADR, the MS attempts data transmission at the IADR. If the MADR is lower than the IADR, the above procedure is repeated. The F-CDRCH is also applicable to other systems.

Referring to FIG. 12, a block encoder 1201 encodes 4-bit F-CDRCH information every 20 ms. The code rate of the block encoder 1201 can be (24, 4), (48, 4), (96, 4), (192, 4), or (384, 4). A sequence repeater 1202 repeats the code symbols with a repetition factor of 16, 8, 4, 2, or 1 according to the code rate. As a result, the sequence repeater 1202 outputs 384 symbols every 20 ms. A QPSK (Quadrature Phase Shift Keying) modulator 1203 QPSK-modulates the repeated symbols and generates 192 modulation symbols every 20 ms. Walsh spreaders 1204-0 and 1204-1 spread I-channel and Q-channel modulation symbols with Walsh functions of length 128.

Figure 13:
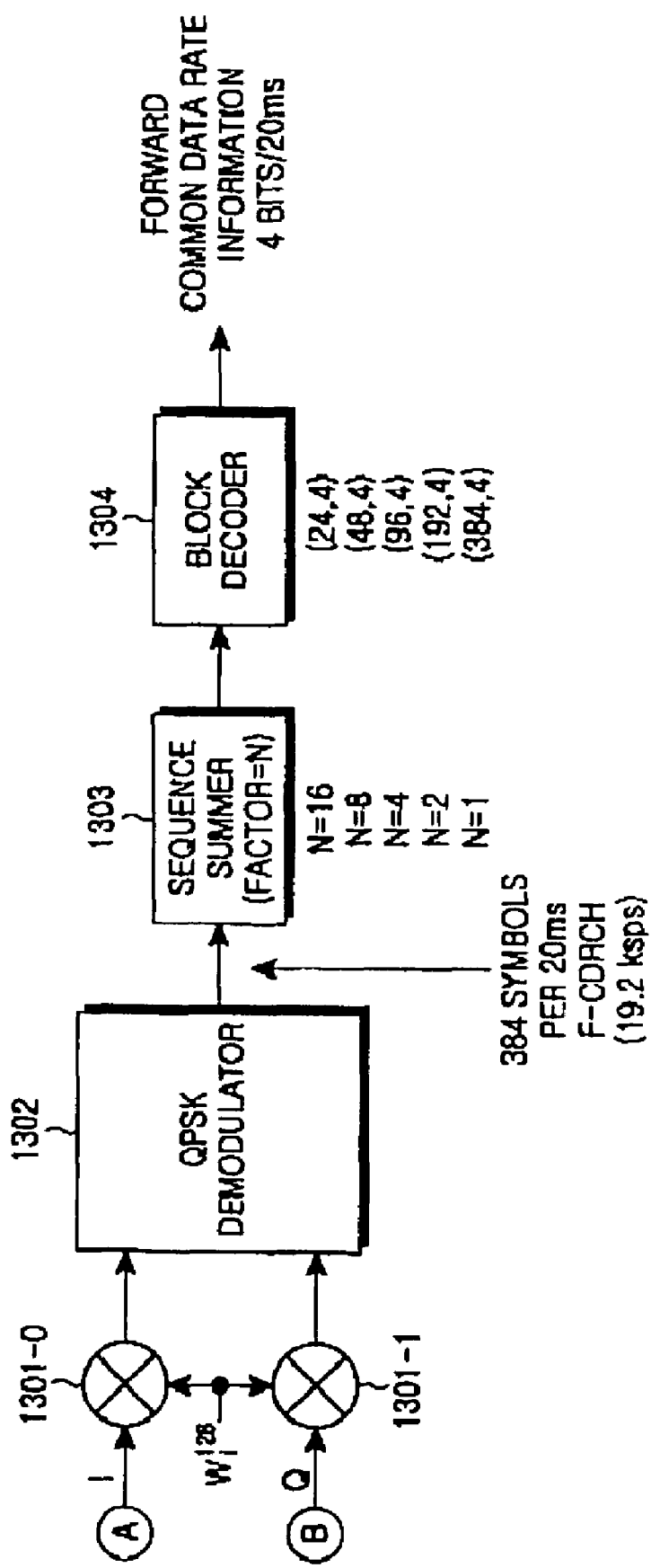
FIG. 13 is a block diagram of an F-CDRCH receiver according to the present invention.

FIG. 13 is a block diagram of an F-CDRCH receiver according to the present invention. The F-CDRCH receiver is the counterpart of the F-CDRCH transmitter illustrated in FIG. 12. Referring to FIG. 13, Walsh despreaders 1301-0 and 1301-1 each despread 24,576 chips with Walsh functions of length 128 every 20 ms and generate 192 QPSK modulation symbols. A QPSK demodulator 1302 QPSK-demodulates the outputs of the Walsh despreaders 1301-0 and 1301-1 and output 384 demodulation symbols every 20 ms. A sequence summer 1303 sums the sequences with the same factor as used for repetition in the transmitter. If a summation factor is 16, 8, 4, 2, or 1, the sequence summer 1303 outputs 24, 48, 96, 192, or 384 symbols. A decoder 1304 decodes the output of the sequence summer 1303 and outputs 4-bit F-CDRCH information.

In accordance with the present invention, an MS reports its data rate increase or decrease status to a BS, so that the BS can efficiently control overload in mobile communication systems such as 1x EV-DO and 1x EV-DV. Thus system performance and system capacity are ensured. Further, a reverse data rate can be determined, taking the characteristics of reverse data, and an efficient reverse data rate control is possible for each MS.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting reverse data to a base station in one of a plurality of mobile stations in a mobile communication system, comprising the steps of:
   receiving information about a maximum allowable data rate (MADR) from the base station in a first predetermined frame period;
   determining a data rate equal to or lower than the MADR and requesting the determined data rate to the base station; and
   starting data transmission if an MADR received from the base station in a second frame period following the first frame period is higher than the requested data rate.

2. The method of claim 1, further comprising the step of measuring a traffic to pilot ratio (T/P) from the base station and controlling the determined data rate according to the T/P during data transmission.

3. The method of claim 2, further comprising the step of requesting reverse data transmission at the controlled data rate to the base station.

4. The method of claim 3, wherein the controlled data rate is equal to or lower than a predetermined reverse rate limit (RRL).

5. The method of claim 3, wherein the controlled data rate is higher than a predetermined RRL.

6. The method of claim 1, wherein the base station determines the MADR, taking a power margin into account to prevent the plurality of mobile stations from transmitting reverse data at a same data rate concurrently.

7. The method of claim 1, wherein the mobile station determines the requested data rate, considering the MADR, a power limit, and a buffer status of the mobile station.

8. The method of claim 1, further comprising the step of transmitting a channel assignment request message to the base station if the MADR is equal to or less than a predetermined minimum data rate.

9. The method of claim 1, further comprising the step of determining a next access time point for data transmission if the MADR is equal to or less than a predetermined minimum data rate.

10. A method of transmitting reverse data to a base station in one of a plurality of mobile stations in a mobile communication system, comprising the steps of:
    receiving information about a maximum allowable data rate (MADR) from the base station in a first predetermined frame period, determining a data rate equal to or lower than the MADR, requesting the determined data rate to the base station, starting data transmission if an MADR received from the base station in a second frame period following the first frame period is higher than the requested data rate, in an initial data transmission; and measuring a traffic to pilot ratio (T/P) from the base station, controlling the determined data rate according to the T/P after the initial data transmission.

11. A method of transmitting reverse data to a base station in one of a plurality of mobile stations in a mobile communication system, comprising the steps of:

receiving information about a maximum allowable data rate (MADR) from the base station in a first predetermined frame period, determining a data rate equal to or lower than the MADR, requesting the determined data rate to the base station, starting data transmission if an MADR received from the base station in a second frame period following the first frame period is higher than the requested data rate, in an initial data transmission;

measuring a traffic to pilot ratio (T/P) from the base station, controlling the determined data rate according to the T/P, and controlling a transmission power of the mobile station according a congestion control bit (CCB) received from the base station, after the initial data transmission; and retransmitting retransmission frames to the base station at the requested data rate for the initial data transmission upon a request for retransmission from the base station and controlling a transmission power of the retransmission frames of which a number is determined according to a T/P change and the CCB.

12. A method of transmitting reverse data to a base station in one of a plurality of mobile stations in a mobile communication system, comprising the steps of:

receiving information about a maximum allowable data rate (MADR) from the base station in a first predetermined frame period, determining a data rate equal to or lower than the MADR, requesting the determined data rate to the base station, starting data transmission if an MADR received from the base station in a second frame period following the first frame period is higher than the requested data rate, in an initial data transmission;

measuring a traffic to pilot ratio (T/P) from the base station, controlling the determined data rate according to the T/P, and controlling a transmission power of the mobile station according a congestion control bit (CCB) received from the base station, after the initial data transmission; and retransmitting as many retransmission frames as set in information about a number of retransmission frames received from the base station at the requested data rate for the initial data transmission to the base station upon a request for retransmission from the base station.

13. A method of transmitting data rate information to a mobile station that is to transmit reverse data to a base station among a plurality of mobile stations in the base station of a mobile communication system, comprising the steps of:

transmitting information about a first maximum allowable data rate (MADR) to each of the mobile stations in a first predetermined frame period;

calculating a sum of data rates requested by the mobile stations;

transmitting information about a second MADR, which can accommodate all of the mobile stations, to the mobile stations in a second frame period following the first frame period if the sum is equal to or lower than an overall data rate capacity available to the base station; and selecting a mobile station among the mobile stations if the sum is higher than the overall data rate capacity, and transmitting information about a third MADR to the selected mobile station in the second frame period.

14. The method of claim 13, wherein the mobile station is selected according to a class of the mobile station, an amount of reverse transmission data from the mobile station, and characteristics of the reverse transmission data.

15. A reverse data transmitting apparatus in a mobile communication system, comprising:

a base station; and a plurality of mobile stations that transmit reverse data to the base station, wherein one of the mobile stations receives information about a maximum allowable data rate (MADR) from the base station in a first predetermined frame period, determines a data rate equal to or lower than the MADR, requests the determined data rate to the base station, and starts data transmission if an MADR received from the base station in a second frame period following the first frame period is higher than the requested data rate.

16. The reverse data transmitting apparatus of claim 15, wherein the mobile station measures a traffic to pilot ratio (T/P) from the base station and controls the determined data rate according to the T/P during data transmission.

17. The reverse data transmitting apparatus of claim 16, wherein the mobile station requests reverse data transmission at the controlled data rate to the base station.

18. The reverse data transmitting apparatus of claim 17, wherein the controlled data rate is equal to or lower than a predetermined reverse rate limit (RRL).

19. The reverse data transmitting apparatus of claim 17, wherein the controlled data rate is higher than a predetermined RRL.

20. The reverse data transmitting apparatus of claim 15, wherein the base station determines the MADR, taking a power margin into account, to prevent the plurality of mobile stations from transmitting reverse data at a same data rate concurrently.

21. The reverse data transmitting apparatus of claim 15, wherein the mobile station determines the requested data rate, considering the MADR, a power limit, and a buffer status of the mobile station.

22. The reverse data transmitting apparatus of claim 15, wherein the mobile station transmits a channel assignment request message to the base station if the MADR is equal to or less than a predetermined minimum data rate.

23. The reverse data transmitting apparatus of claim 15, wherein the mobile station determines a next access time point for data transmission if the MADR is equal to or less than a predetermined minimum data rate.

24. A reverse data transmitting apparatus in a mobile communication system, comprising:

a base station; and a plurality of mobile stations that transmit reverse data to the base station, wherein one of the mobile stations receives information about a maximum allowable data rate (MADR) from the base station in a first predetermined frame period, determines a data rate equal to or lower than the MADR, requests the determined data rate to the base station, and starts data transmission if an MADR received from the base station in a second frame period following the first frame period is higher than the requested data rate, in an initial data transmission; and measures a traffic to pilot ratio (T/P) from the base station and controls the data rate according to the T/P after the initial data transmission.

25. A reverse data transmitting apparatus in a mobile communication system, comprising:

a base station; and a plurality of mobile stations that transmit reverse data to the base station, wherein one of the mobile stations receives information about a maximum allowable data rate (MADR) from the base station in a first predetermined frame period, determines a data rate equal to or lower than the MADR, requests the determined data rate to the base station, and starts data transmission if an MADR received from the base station in a second frame period following the first frame period is higher than the requested data rate, in an initial data transmission;

measures a traffic to pilot ratio (T/P) from the base station, controlling the data rate according to the T/P and controls a transmission power of the mobile station according a congestion control bit (CCB) received from the base station, after the initial data transmission; and retransmits retransmission frames to the base station at the requested data rate for initial data transmission upon request for retransmission from the base station and controls a transmission power of the retransmission frames of which a number is determined according to a T/P change and the CCB.

26. A reverse data transmitting apparatus in a mobile communication system, comprising:

a base station; and a plurality of mobile stations that transmit reverse data to the base station, wherein one of the mobile stations receives information about a maximum allowable data rate (MADR) from the base station in a first predetermined frame period, determines a data rate equal to or lower than the MADR, requests the determined data rate to the base station, and starts data transmission if an MADR received from the base station in a second frame period following the first frame period is higher than the requested data rate, in an initial data transmission;

measures a traffic to pilot ratio (T/P) from the base station, controlling the data rate according to the T/P and controls a transmission power of the mobile station according a congestion control bit (CCB) received from the base station, after the initial data transmission; and retransmits as many retransmission frames as set in information about a number of retransmission frames received from the base station at the requested data rate for initial data transmission to the base station upon a request for retransmission from the base station.

27. An apparatus for transmitting reverse data rate information in a mobile communication system, comprising:

a base station; and a plurality of mobile stations that transmit reverse data to the base station, wherein the base station transmits information about a first maximum allowable data rate (MADR) to each of the mobile stations in a first predetermined frame period, calculates a sum of data rates requested by the mobile stations, transmits information about a second MADR, which can accommodate all of the mobile stations, to the mobile stations in a second frame period following the first frame period if the sum is equal to or lower than an overall data rate capacity available to the base station, selects a mobile station among the mobile stations if the sum is higher than the overall data rate capacity, and transmits information about a third MADR to the selected mobile station in the second frame period.

28. The apparatus of claim 27, wherein the base station selects the mobile station according to a class of the mobile station, an amount of reverse transmission data from the mobile station, and characteristics of the reverse transmission data.

* * * * *